United States Patent [19]

Kanda et al.

[11] Patent Number: 4,920,175

[45] Date of Patent: Apr. 24, 1990

[54] MICROPARTICLES HAVING CROSSLINKING REACTION PROMOTOR FUNCTION AND METHOD OF USE

[75] Inventors: Kazunori Kanda, Yao; Shinichi Ishikura, Tsuzuki; Keizou Ishii, Ashiya; Akio Kashihara, Hirakata, all of Japan

[73] Assignee: Nippon Paint Co., Ltd., Osaka, Japan

[21] Appl. No.: 225,119

[22] Filed: Jul. 28, 1988

Related U.S. Application Data

[63] Continuation-in-part of Ser. No. 21,000, Mar. 2, 1987, Pat. No. 4,777,213, which is a continuation of Ser. No. 745,983, Jun. 18, 1985, abandoned.

[30] Foreign Application Priority Data

Jun. 18, 1984 [JP] Japan .................................. 59-126225

[51] Int. Cl.$^5$ .............................................. C08L 63/00
[52] U.S. Cl. ..................................... 525/110; 523/201; 523/204; 523/202; 523/404; 523/414; 523/416; 524/507; 524/512; 525/107; 525/155; 525/157; 525/162; 525/163; 525/166; 428/417; 428/418; 428/458

[58] Field of Search ............... 525/108, 155, 162, 163, 525/166, 110, 157; 526/286; 523/201, 204, 202

[56] References Cited

U.S. PATENT DOCUMENTS

| | | | |
|---|---|---|---|
| 4,340,511 | 7/1982 | Barkhouse et al. | 524/204 |
| 4,427,820 | 1/1984 | Backhouse et al. | 524/504 |
| 4,468,493 | 8/1984 | Ishikura et al. | 525/123 |
| 4,569,966 | 2/1986 | Piccirilli et al. | 524/589 |

*Primary Examiner*—Theodore E. Pertilla
*Attorney, Agent, or Firm*—Millen, White & Zelano

[57] ABSTRACT

Promotors for a crosslinking reaction involved in the curing of a system comprising crosslinkable polymers are bound to polymeric microparticles having a diameter of about 0.01 to 6 microns prepared by polymerizing a mixture of ethylenically unsaturated monomers. The microparticles carrying the crosslinking reaction promotor may be incorporated to coating compositions, printing inks, sealants, adhesives and other polymeric products in place of conventional crosslinking reaction promotors.

6 Claims, No Drawings

MICROPARTICLES HAVING CROSSLINKING REACTION PROMOTOR FUNCTION AND METHOD OF USE

CROSS-REFERENCE TO RELATED APPLICATION

This is a continuation-in-part of application Ser. No. 021,000 filed Mar. 2, 1987, now Pat. No. 4,777,213 which is, in turn, a continuation of application Ser. No. 745,983 filed June 18, 1985, now abandoned.

BACKGROUND OF THE INVENTION

The present invention relates to polymeric microparticles capable of promoting the crosslinking reaction of a crosslinkable polymer used in, for example, coating compositions, printing inks, sealants, adhesives and the like.

As is well-known, melamine-acrylic coating compositions are cured into a rigid coating film through the crosslinking reaction of hydroxyl group-containing acrylic polymer with melamine resin at an elevated temperature. Usually a catalytic amount of proton donors is added to the reaction system to promote the crosslinking reaction. Otherwise the reaction will not be completed within a reasonable length of time.

The term "crosslinking reaction" as used herein means the reaction in which starting monomers, oligomers or polymers are reacted with each other or with a crosslinking agent to increase their molecular weights by setting up chemical links between the molecular chains of the resulting polymers.

Crosslinking reaction promoters are used not only in coating compositions but also in printing inks, adhesives, sealants and other polymeric products. Although its presence is practically imperative, the crosslinking reaction promoter is a separate component for the polymer to be crosslinked and is often incompatible with the polymer in a system containing the same. Thus, it is often difficult to disperse the crosslinking reaction promoter uniformly in the polymer system for ensuring uniform crosslinking. Also, the polymer system containing the crosslinking reaction promoter generally tends to be unstable upon storage.

The crosslinking reaction promoter usually remains as such in the cured polymer after having performed its function and is susceptible to migration and leaching outside the cured polymer, thereby causing various disadvantages.

It is, therefore, a principal object of the present invention to provide a new form of crosslinking reaction promoters which may avoid or minimize various disadvantages associated with conventional crosslinking reaction promoters.

It is another object of the present invention to provide a method for curing a crosslinkable polymer through a crosslinking reaction into a rigid state in which the crosslinking reaction promoter is immodilized.

Other objects and advantages of the present invention will become apparent as the description proceeds.

BRIEF DESCRIPTION OF THE INVENTION

According to the present invention, these and other objects may be accomplished by providing microparticles having bound therewith a crosslinking reaction promoter and having a diameter of about 0.01 to 6 microns prepared by polymerizing ethylenically unsaturated monomers.

The crosslinking reaction promoter may be proton donors, having a pKa less than 3.0.

The crosslinking reaction promoter may be bound to the microparticles using one of the following techniques: (a) impregnating microparticles with the promoter, (b) admixing the promoter with monomers from which microparticles are prepared, and (c) introducing ethylenic unsaturation function to the promoter molecule and copolymerizing resulting promoter monomer with monomers from which microparticles are prepared.

Preferably, at least a portion of monomers from which microparticles are prepared contains a monomer having at least two polymerizable sites per molecule or a combination of two monomers having mutually reactive groups for internally crosslinking the microparticles so that the resulting microparticles are insoluble in conventional organic solvents. Insoluble microparticles are incorporated to advantages to coating compositions containing organic solvents.

The microparticles themselves may form a part of film-forming components while performing the crosslinking reaction promoter function. The microparticles are retained in an immobilized state in the cured film after having performed the promoter function. Thus, the degradation of coating films due to the migration and leaching of crosslinking reaction promoters may be avoided or minimized.

The microparticles may be uniformly and stably dispersed in solvent type, aqueous type and powder type coating compositions with great ease. Compositions containing the microparticles are very stable upon storage for a long period of time.

The present invention also provides a method of curing a crosslinkable polymer through a self-crosslinking reaction or a crosslinking reaction with a crosslinking agent. The method is characterized by adding to the reaction system containing said crosslinkable polymer a catalytic amount of microparticles having bound therewith a crosslinking reaction promoter and having a diameter of about 0.01 to 6 microns prepared by polymerizing ethylenically unsaturated monomers.

DETAILED DISCUSSION

The nature of particular crosslinking reaction promoter and the method for binding thereof to the microparticles of the present invention may vary depending upon the nature of particular crosslinkable polymer, and thus the type of particular crosslinking reaction. Typical examples thereof are given below.

System Containing Aminoplast Resins

Alkyd resins and acrylic resins containing hydroxyl and/or carboxyl groups may be cured through a crosslinking reaction with aminoplast resins such as melamine resin. Aminoplast resins themselves are also susceptible to a selfcondensation reaction. These reactions may be promoted by a proton donor. The microparticles of the present invention may carry such proton donor function as a separate component or as acid groups such as $-SO_3H$ or $-PO_4H_2$ incorporated into the polymer backbone constituting the microparticles.

Specifically, proton donors may be introduced into the microparticles during their polymerization process by incorporating an amount of a monomer having one of the above described acid groups to the starting monomer mixture. The acid group-bearing monomer should have a pKa less than 3.0 as exemplified by 2-acrylamide-2-methylpropanesulfonic acid, acryloyloxyethyl phosphate and the like.

Alternatively, proton donors may be bound subsequently by impregnating the microparticles with a proton donating substance Examples of such separate proton donors include phosphoric acid, polyphosphoric acid, p-toluenesulfonic acid, high molecular weight-polyalkylarenepolysulfonic acids disclosed in U.S. Pat. No, 3,979,478, amine arenesulfonates disclosed in U.S. Patent No. 3,474,054, 2-dimethylamino-l-methylpropanol p-toluenesulfonate disclosed in U.S. Pat. No. 3,293,324, arenesulfonic acid/oxa-azacyclopentane adducts disclosed in Japanese Patent Kokai (laid open) No. 54-153,397 and the like. These proton donors should also have a pKa less than 3.0 in their unneutralized forms.

The impregnation may be carried out by dissolving the proton donating substance in an organic solvent in which the proton donor is soluble but the microparticles are insoluble and soaking the microparticles in the solution until a desired pick up level is reached. Alternatively, the above may be added to the monomer mixture and polymerizing the monomer mixture containing the proton donating agent. Furthermore, the proton donor may be added to a suspension of freshly prepared microparticles and then separating the microparticles from the suspension medium by a conventional technique such as filtration, spray drying, lyophilization and the like.

System Containing Epoxy Resins

When epoxy resins are cured using a hardener having amino, carboxyl or hydroxyl groups, proton donor promoters are used. The microparticles may be imparted with the proton donor function in the same manner as previously described and the previously described microparticles carrying the proton donor function may also be used for this purpose.

Polymeric Microparticles

Coating compositions containing polymeric microparticles and the preparation of such polymeric microparticles are known. For example, a coating composition comprising a film-forming polymer having a plurality of crosslinkable sites, a volatile organic liquid diluent capable of dissolving or dispersing the film-forming polymer, a crosslinking agent and polymeric microparticles stably dispersed in the coating composition has a advantage in that it may be applied on a substrated in a relatively large film thickness by a single coating operation.

Several methods are known for preparing the microparticles. One method includes the steps of emulsion polymerizing a mixture of ethylenically unsaturated monomers in an aqueous medium, and removing water from the emulsion by means of solvent substitution, azeotropic distillation, centrifugation, drying and the like. Although any conventional emulsifier may be used, ampho-ionic surfactants, polymerizable monomers, oligomers and polymers are preferable for stabilizing polymer particles during the polymerization process. Ampho-ionic group-containing alkyd resins disclosed in U.S. Pat. No. 4,322,324 and amphoteric amino sulfonate derivatives of epoxy resins disclosed in U.S. Pat. No. 4,379,872 may advantageously be employed.

Another method commonly referred to as the non-aqueous dispersion (AND) method or precipitation polymerization method comprises polymerizing a mixture of ethylenically unsaturated monomers in a non-aqueous organic liquid such as aliphatic hydrocarbons or solvents having high solubility parameters in which the monomer mixture is soluble but the polymer is insoluble to form a non-aqueous dispersion of the polymeric microparticles.

The average size of microgel particles varies with the particular polymerization method. Thus, the emulsion polymerization and NAD methods are suitable for the range of 0.01 to 0.6 micron size, the precipitation polymerization method is suitable for the range of 0.2 to 2 micron size, and the suspension or bulk polymerization methods are suitable for the range of 1 to 6 micron size.

The polymeric microparticles of the present invention may be prepared by any known method except that the microparticles are imparted with the desired crosslinking reaction promoter function using various techniques as hereinbefore discussed.

The starting monomer mixture preferably contains, at least as a portion thereof, a monomer having at least two polymerizable sites per molecule or a combination of two monomers having mutually reactive group to give microparticles which are insoluble in conventional organic solvents used in the coating industry. This is particularly advantageous when the microparticles are used in coating compositions containing such organic solvents, although the microparticles need not be internally crosslinked in other usages.

The polymeric microparticles of the present invention have a diameter of about 0.01 to 6 microns for retaining a good dispersibility, reactivity and stability in the crosslinkable polymer system.

At a given microparticle content in a coating system, the total surface area of the microparticles available for carrying the promoter substance is proportional to the reciprocal of the average radius of the microparticles. However, the effect of the microparticles added to the coating system descreases with the decrease in the average radius. Accordingly, the particle size of microparticles may advantageously selected whether the promoter activity outweigh the filler effect or vice versa.

The crosslinked reaction promoted by the polymeric microparticles of the present invention takes place on the surface of the microparticles. Thus it is advantageous to localize the promoter substances near the exterior surface of microparticles as much as possible. This may be done by controlling the polymerization process of microparticles or by the selection of the method of binding the promoter substance to the microparticles. The localization of promoter substance may be determined by conventional surface analyzing methods such as ESCA, AES, FT-IR and the like.

Examples of ethylenically unsaturated comonomers used for the production of microparticles include methyl (meth)acrylate, ethyl (meth)acrylate, n-butyl (meth)acrylate, isobutyl (meth)acrylate, 2-ethylhexyl (meth)acrylate, styrene, α-methylstyrene, vinyltoluene, t-butylstyrene, ethylene, propylene, vinyl acetate, vinyl propionate, acrylonitrile, methacrylonitrile, dimethylaminoethyl (meth)acrylate and the like. Two or more comonomers may be combined.

Cross-linking comonomers include a monomer having at least two ethylenically unsaturated bonds per molecule and the combination of two different monomers having mutually reactive groups.

Monomers having at least two polymerization sites may typically be represented by esters of a polyhydric alcohol with an ethylenically unsaturated monocarboxylic acid, esters of an ethylenically unsaturated monoalcohol with a polycarboxylic acid and aromatic compounds having at least two vinyl substituents. Specific examples thereof include ethylene glycol diacrylate, ethylene glycol dimethacrylate, triethylene glycol dimethacrylate, tetraethylene glycol dimethacrylate, 1,3-butylene glycol dimethacrylate, trimethylolpropane triacrylate, trimethylolpropane trimethacrylate, 1,4-butanediol diacrylate, neopentyl glycol diacrylate, 1,6-hexanediol diacrylate, pentaerythritol diacrylate, pentaerythritol triacrylate, pentaerythritol tetracrylate, pentaerythritol dimethacrylate, pentaerythritol trimethacrylate, pentaerythritol tetramethacrylate, glycerol diacrylate, glycerol allyloxy dimethacrylate, 1,1,1-tris(hydroxymethyl) ethane diacrylate, 1,1,1-tris(hydroxymethyl)-ethane triacrylate, 1,1,1-tris(hydroxymethyl)ethane dimethacrylate, 1,1,1-tris(hydroxymethyl)ethane trimethacrylate, 1,1,1-tris (hydroxymethyl)propane diacrylate, 1,1,1-tris(hydroxymethyl) propane triacrylate, 1,1,1-tris(hydroxymethyl)-propane dimethacrylate, 1,1,1-tris(hydroxymethyl)propane trimethacrylate, triallyl cyanurate, triallyl isocyanurate, triallyl trimellitate, diallyl phthalate, diallyl terephthalate and divinyl benzene.

Combinations of two monomers having mutually reactive groups may be used in place of, or in addition to monomers having two or more polymerization sites. For example, monomers having a glycidyl group such as glycidyl acrylate or methacrylate may be combined with carboxyl group-containing monomers such as acrylic, methacrylic or crotonic acid. Also, hydroxyl group-containing monomers such as 2-hydroxyethyl (meth)acrylate, 2-hydroxypropyl (meth)acrylate, hydroxybutyl (meth)acrylate, allyl alcohol or methallyl may be combined with isocyanato group-containing monomers such as vinyl isocyanate or isopropenyl isocyanate.

The promoter substance bound to the polymeric microparticles may promote not only the crosslinking reaction of a resin, but also reactions between the resin and the microparticles and between microparticles themselves. To this end, the microparticles may preferably have crosslinkable functional groups as previously discussed with reference to crosslinkable film-forming polymers.

When a further coating layer is formed over the coating containing the microparticles of the present invention to prepare a multilayer coating, the microparticles remaining near the exterior surface of the lower coating layer may advantageously promote the crosslinking reaction between the upper and lower layers. This greatly improves the adhesion between layers and other strength properties of the multilayer coating.

The polymeric promote microparticles of the present invention may be used in a crosslinkable polymer system instead of adding conventional promoters which are not bound to the microparticles. The amount of microparticles to be added is such that the amount of active substance bound to the microparticles is at least equivalent to the amount of free promoter substance in which it is normally used.

When a single composition contains a plurality of crosslinkable polymer systems, mixtures of microparticles of two or more different types may be added. For example, a mixture of two or more types of microparticle carrying a photosensitizer and a heat curing promoter, respectively may be added to a system containing both a photocurable component and a heat-curable component.

The polymeric promoter microparticles of the present invention may be used in coating compositions of solvent type, aqueous type or powder type. The coating composition may be of a type which cures either at room temperature or at an elevated temperature.

The following examples illustrate the invention. All parts and percents are by weight unless otherwise indicated.

REFERENCE EXAMPLE 1

Preparation of Emulsifier

To a two liter flask having stirring means, a reflux condenser, temperature-control means, a nitrogen gas-introducing tube and a decanter were added 134 parts of N,N-bis(hydroxyethyl)taurine, 130 parts of neopentyl glycol, 236 parts of azelaic acid, 186 parts of phthalic anhydride, and 27 parts of xylene. The mixture was refluxed and water was removed as an azeotropic mixture with xylene. The temperature was raised to 190° C. over 2 hours and the reaction was continued with stirring until an acid number of 145 was reached.

The reaction product was cooled to 140° C. and 314 parts of CARDURA E-10(glycidyl versatate, Shell Chemical Company) was added dropwise over 30 minutes at 140° C. The reaction was continued for additional two hours with stirring. A polyester resin having an acid number of 59, a hydroxyl number of 90 and a number average molecular weight ($\overline{Mn}$) of 1054 was obtained.

REFERENCE EXAMPLE 2

Preparation of Emulsifier

A flask used in Reference Example 1 was charged with 73.5 parts of sodium tauronate, 100 parts of ethylene glycol, and 200 parts of ethylene glycol monomethyl ether. The temperature was raised to 120° C. with stirring to give a uniform solution. To the solution was added with stirring a solution of 470 parts of EPIKOTE 1001 (Shell Chemical Company, bisphenol A diglycidyl ether epoxy resin having an epoxy equivalent of 470) in 400 parts of ethylene glycol monomethyl ether over 2 hours. The mixture was stirred at the same temperature for additional 20 hours to complete the reaction. The reaction mixture was treated as in Reference Example 1 to give 518 parts of modified epoxy resin. The resin had an acid number of 49.4 (KOH titration) and a sulfur content of 2.8% (X-ray fluorometry).

EXAMPLE 1

Microparticles Carrying Proton Donor

To a one liter flask having stirring means, cooling means and temperature-control means were added 300 parts of deionized water. The flask was purged with $N_2$ gas with stirring and water was heated to 80° C.

To the flask were added dropwise a pre-emulsified mixture consisting of 90 parts of styrene, 90 part of methyl methacrylate, 120 parts of n-butyl acrylate, 6 parts of sodium alkylbenzenesulfonate and 150 parts of deionized water, and a solution of 6 parts of 2-acrylamide-2-methylpropanesulfonic acid and 6 parts of ammonium persulfate in 50 parts of deionized water over 2 hours with stirring. A dispersion of microparticles having a diameter of 0.8 microns and having a nonvolatile content of 37% was obtained.

EXAMPLE 2

Microparticles of carrying Proton Donor

A flask used in Example 1 was charged with 370 parts of deionized water, 40 parts of emulsifier prepared in Reference Example 1 and 3 parts of dimethylethanolamine. The mixture was stirred at 80° C. to make a solution. To the solution was added a solution of 4.5 parts of azobiscyanovaleric acid and 4.3 parts of dimethylethanolamine in 45 parts of deionized water. Then a monomer mixture consisting of 65 parts of methyl methacrylate, 90 parts of n-butyl acrylate, 70 parts of styrene, 5 parts of 2-hydroxyethyl acrylate and 15 parts of ethylene glycol dimethacrylate and a solution of 5 parts of 2-acrylamide-2-methylpropanesulfonic acid and 1.9 parts of dimethylethanolamine in 30 parts of deionized water were added dropwise over 60 minutes. Then a solution of 1.5 parts of azobiscyanovaleric acid and 1.4 parts of dimethylethanolamine in 15 parts of deionized water was added. The mixture was stirred at 80° C. for 60 minutes to give an aqueous dispersion having a nonvolatile content of 38%, a pH of 7.2 and a particle diameter of 0.05 microns.

The aqueous phase of this dispersion was replaced with xylene using azeotropic distillation to give a dispersion in xylene having a microparticle content of 35%.

EXAMPLE 3

Heat-Curable Epoxy Coating Composition 50 parts of EPIKOTE 1001 (bisphenol A diglycidyl ether epoxy resin, Shell Chemical Company) were dissolved in 50 parts of cellosolve acetate and 50 parts of methyl ethyl ketone. To the solution was added 15 parts of CYMEL 303 (hexamethoxymethyl melamine, Mitsui Cyanamid Co., Ltd.) and 10 parts of microparticle dispersion prepared in Example 2.

The resulting composition was applied on a steel plate of 0.6 mm thickness to a dry film thickness of 20 microns using a bar coater and baked at 200° C. for 15 minutes to give a cured film having a pencil hardness of 2H.

EXAMPLE 4

Heat-Curable Acrylic Emulsion Coating Composition

To 100 parts of PRIMAL AC-1533 (heat-curable acrylic emulsion, Rohm & Haas Co.) were added 15 parts of CYMEL 303 and 5 parts of aqueous dispersion of microparticles prepared in Example 1.

The resulting composition was applied on a glass plate to a dry film thickness of 20 microns using a bar coater and baked at 150° C. for 20 minutes to give a cured film having a pencil hardness of H.

What is claimed is:

1. A coating system comprising a film-forming polymer capable of curing through a self-crosslinking reaction or a crosslinking reaction with a separate crosslinker and a catalytic amount of an agent for promoting the crosslinking reaction, wherein said agent is bound to polymer microparticles having a diameter of 0.01 to 6 microns present in said system, said polymer microparticles being prepared by polymerizing a mixture of ethylenically unsaturated monomers, said agent being an $-SO_3H$ or $-PO_4H_2$ group bearing proton donor having a pKa less than 3.0, said coating system containing an aminoplast resin, or a combination of an aminoplast resin with a hydroxy group, carboxyl group or mixture thereof containing alkyd or acrylic resin or a combination of an epoxy resin with a hardener having amino, carboxyl or hydroxyl groups.

2. The system according to claim 1 wherein said agent is bound to said polymer microparticles by chemically introducing an ethylenic unsaturation function into the promoting agent molecule and copolymerizing the resulting promoting agent-containing monomer with said monomer mixture.

3. The system according to claim 1 wherein said agent is bound to said polymer microparticles by incorporating the promoting agent into said monomer mixture and polymerizing the monomer mixture containing the promoting agent.

4. The system according to claim 1 wherein said agent is bound to said polymer microparticles by adding to a suspension of freshly prepared polymer microparticles in a liquid and separating the microparticles from the suspension liquid.

5. The system according to claim 1 wherein said agent is bound to said polymer microparticles by impregnating the polymer microparticles with a solution of said promoting agent.

6. The system according to claim 1 wherein said polymerization is carried out by emulsion polymerizing said monomer mixture in the presence of an amphoionic substance.

* * * * *